United States Patent
Schneider et al.

(10) Patent No.: US 8,925,814 B1
(45) Date of Patent: Jan. 6, 2015

(54) APPARATUS FOR AND METHOD OF MONITORING OUTPUT POWER OF A LASER BEAM DURING READING OF TARGETS

(71) Applicant: Symbol Technologies, Inc., Schaumburg, IL (US)

(72) Inventors: Gary G Schneider, Stony Brook, NY (US); Peter Fazekas, Bayport, NY (US); James R Giebel, Centerport, NY (US); Mark A Weitzner, Plainview, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 14/050,027

(22) Filed: Oct. 9, 2013

(51) Int. Cl.
  *G06K 7/00* (2006.01)
  *G06K 7/10* (2006.01)

(52) U.S. Cl.
  CPC .................................. *G06K 7/10584* (2013.01)
  USPC ..................................... 235/438; 235/462.26

(58) Field of Classification Search
  USPC .......... 235/436, 438, 462.15, 462.25, 462.26, 235/462.45, 472.01
  See application file for complete search history.

(56) References Cited

U.S. PATENT DOCUMENTS

| | | | |
|---|---|---|---|
| 5,561,283 A * | 10/1996 | Dvorkis et al. | 235/462.09 |
| 5,612,529 A * | 3/1997 | Coleman | 235/455 |
| 6,360,949 B1 | 3/2002 | Shepard et al. | |
| 7,267,283 B2 * | 9/2007 | Schneider et al. | 235/472.01 |
| 7,441,703 B2 * | 10/2008 | Moon et al. | 235/454 |
| 8,028,917 B2 | 10/2011 | Giebel | |
| 8,087,589 B2 | 1/2012 | Heinrich et al. | |
| 2005/0141069 A1 | 6/2005 | Wood et al. | |
| 2007/0063048 A1 * | 3/2007 | Havens et al. | 235/462.46 |
| 2007/0069027 A1 | 3/2007 | Madej | |
| 2009/0084853 A1 | 4/2009 | Giebel et al. | |

FOREIGN PATENT DOCUMENTS

EP  03646767 A2  4/1990

* cited by examiner

*Primary Examiner* — Daniel St Cyr

(57) ABSTRACT

A target is read in the presence of interference light. A photodetector generates an output signal composed of an information signal and an interference light signal. A rangefinder determines the distance of the target in a range of working distances. A controller adjusts a scan angle of a scan drive to a narrow value and adjusts an output power of a laser diode to a low power level when the target is determined to be far out in the range. The controller adjusts the scan angle to a wide value and adjusts the output power to a high power level when the target is determined to be close in the range. Signal processing circuitry processes the output signal with the information signal having a greater magnitude than that of the interference signal due to the high power level to mitigate the presence of the interference light. A power safety arrangement including dual power monitors checks the output power of the laser beam.

20 Claims, 5 Drawing Sheets

APPARATUS FOR AND METHOD OF MONITORING OUTPUT POWER OF A LASER BEAM DURING READING OF TARGETS

FIELD OF THE DISCLOSURE

The present disclosure relates generally to an apparatus for, and a method of, electro-optically reading a target in the presence of ambient light, especially when emitted from fluorescent lamps and light emitting diodes (LEDs) operated at kilohertz frequencies, and, more particularly, to mitigating the presence of the ambient light by increasing an output power level of a laser diode that emits a laser beam that is swept across the target, and, still more particularly, to monitoring the elevated output power level of the laser beam so as not to exceed a safety limit during such reading, and especially during such mitigation.

BACKGROUND

Moving laser beam readers or laser scanners have long been used as data capture devices to electro-optically read targets, such as one-dimensional bar code symbols, particularly of the Universal Product Code (UPC) type, printed on labels associated with products in many venues, such as supermarkets, warehouse clubs, department stores, and other kinds of retailers, as well as many other venues, such as libraries and factories. The moving laser beam reader generally includes a housing, a laser for emitting a laser beam having an output power, a focusing lens assembly for focusing the laser beam to form a beam spot having a certain size at a focal plane in a range of working distances relative to the housing, a scan component for repetitively scanning the beam spot over a scan angle across a target in a scan pattern, for example, a scan line or a series of scan lines, across the target multiple times per second, and a photodetector for detecting return light reflected and/or scattered from the target and for converting the detected return light into an analog electrical information signal bearing information related to the target. This analog electrical information signal varies in amplitude as a function of time due to the time-varying return light along each scan line, and varies in frequency as a function of the density of the symbol, as well as the distance at which the symbol is being read. The moving laser beam reader also includes signal processing receiver circuitry including a digitizer for digitizing the variable analog information signal, and a microprocessor for decoding the digitized signal based upon a specific symbology used for the target. The decoded signal identifies the product and is transmitted to a host, e.g., a cash register in a retail venue, for further processing, e.g., product price look-up or product inventorying.

In one advantageous embodiment, during operation of the moving laser beam reader in a venue having one or more external light sources that emit ambient light, an operator holds the housing in his or her hand, and aims the housing at the target, and then initiates the data capture and the reading of the target by manual actuation of a trigger on the housing. The ambient light is also concomitantly detected by the photodetector, which generates an analog electrical ambient light signal. In the event that the external source is sunlight, then the ambient light is substantially constant in magnitude, and therefore, the analog electrical ambient light signal has a constant illumination DC component. In the event that the external source is an incandescent bulb or a fluorescent lamp energized at 50 Hz or 60 Hz, then the analog electrical ambient light signal has a constant illumination DC component and a relatively small time-varying AC frequency component at 50 Hz or 60 Hz. In the event that the fluorescent lamp is operated at higher frequencies for greater luminous efficiency, or in the event that the external source includes light emitting diodes (LEDs) operated at higher frequencies, then the analog electrical ambient light signal has a constant illumination DC component and a relatively larger time-varying AC frequency component at kilohertz frequencies, typically anywhere from 30 kHz to 300 kHz.

In some circumstances, the presence of the ambient light signal interferes with, and weakens, the information signal. To prevent such interference, it is known to filter the constant illumination DC component of the ambient light signal out from the information signal. Also, filters can be used to suppress the ambient light signal when its time-varying frequency component is very far in frequency away from the frequency of the information signal. However, if the time-varying frequency component and the magnitude component of the ambient light signal are too close in frequency and magnitude to the frequency and magnitude of the information signal, then the ambient light signal can interfere and impede the decoding of the information signal, thus degrading the performance of the reader. By way of non-limiting example, an information signal of about 50 kHz and its harmonic at about 100 kHz can be generated during reading of a low density symbol located relatively close to the reader, e.g., about 10 inches or less away from the reader. If the ambient light source includes LEDs operated to have a frequency of about 100 kHz, then the 100 kHz frequencies of the ambient light signal and the information signal are too close in frequency and magnitude, and may cause an interference, and perhaps cause the symbol not to be successfully decoded and read.

In addition to filters, to prevent such interference, it is also known to increase the magnitude of the information signal above the magnitude of the ambient light signal. This does increase the signal-to-noise ratio between the information signal and the ambient light signal to enhance reader performance. However, there are limits to how much the magnitude of the information signal can be increased. Governmental and industrial safety standards exist for how much laser power can be safely emitted from a laser beam reader. Also, some lasers may burn out if their rated laser output power levels are exceeded, and these burn-out levels may change as a function of such factors as laser age, environmental temperature, laser usage, etc.

Accordingly, there is a need to monitor the elevated output power level of the laser beam in such laser beam readers so as not to exceed a safety limit during such reading, and especially during such mitigation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
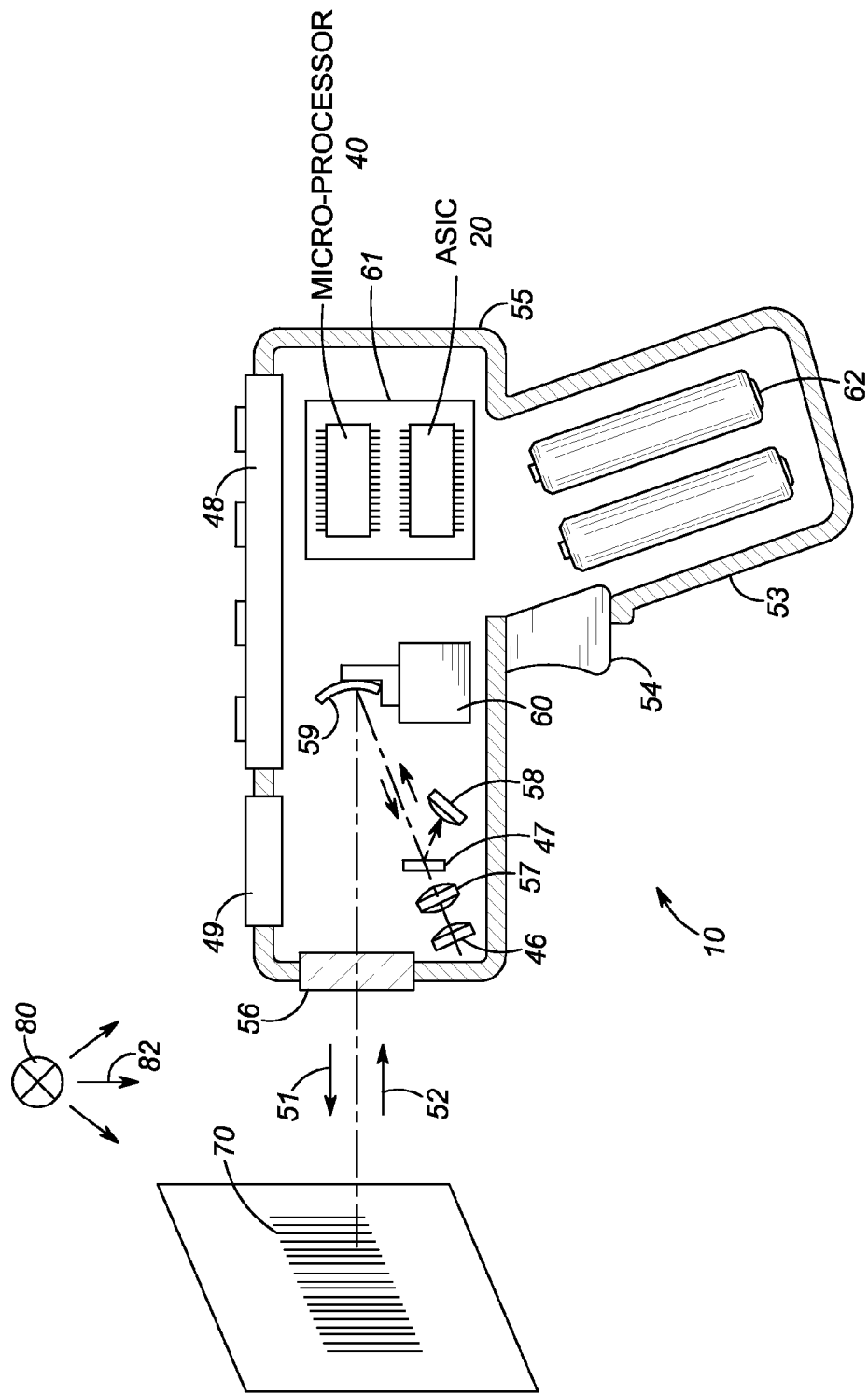
FIG. 1 is a schematic view of a handheld moving laser beam reader apparatus operative for monitoring an elevated output power level of a laser beam when mitigating an ambient light signal in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to an apparatus for electro-optically reading a target, e.g., a bar code symbol, located in a range of working distances in the presence of ambient interference light to be mitigated. The apparatus includes a laser drive having a laser diode for emitting a laser beam having an adjustable output power, and a monitor photodiode for monitoring the output power of the laser beam with a responsivity characteristic. The apparatus further includes a scan drive for scanning the laser beam across the target for reflection and scattering therefrom as return laser light, and a photodetector for generating an output signal by detecting the return laser light from the target to convert the detected return laser light into an analog electrical information signal bearing information related to the target, and by concomitantly detecting the ambient interference light to convert the detected ambient interference light into an analog electrical ambient interference light signal.

The apparatus further includes signal processing circuitry for processing the output signal. The signal processing circuitry has a controller, e.g., a microprocessor, operatively connected to the laser drive and operative, in a reading mode of operation, for initially adjusting the output power to a test power level, and for subsequently increasing the output power for a predetermined time period from the test power level to an elevated power level at which the information signal of the processed output signal has a greater magnitude than that of the interference light signal to mitigate the presence of the ambient interference light, and for subsequently decreasing the output power to the test power level after elapse of the predetermined time period. Reading performance is therefore enhanced, because the signal-to-noise ratio between the information signal and the interference light signal has been increased.

A power safety arrangement checks the output power of the laser beam in the reading mode. The power safety arrangement includes a first power monitor operatively connected to the laser diode for testing the output power at the test power level, and a second power monitor operatively connected to the monitor photodiode for testing the output power at the test power level and at the elevated power level. The second power monitor is the only operative monitor during the predetermined time period.

Advantageously, the first power monitor is operative for measuring a calibration differential of electrical current flowing through the laser diode at different calibration power levels set by the controller in a calibration mode of operation, and for measuring a test differential of electrical current flowing through the laser diode at the test power level and at another lower test power level in the reading mode. The controller is operative, in the reading mode, for comparing the test and calibration differentials, and for determining that the output power of the laser beam does not exceed a safety level when the test differential does not exceed the calibration differential.

Advantageously, the second power monitor is operative for measuring calibration voltages corresponding to electrical currents flowing through the monitor photodiode at the test power level and at the elevated power level set by the controller in a calibration mode of operation, and for measuring test voltages corresponding to electrical currents flowing through the monitor photodiode at the test power level and at the elevated power level set by the controller in the reading mode of operation. The controller is operative, in the reading mode, for comparing the test and calibration voltages, and for determining that the output power of the laser beam does not exceed a safety level when the test voltages do not exceed the calibration voltages.

In a preferred embodiment, the signal processing circuitry also has a rangefinder for determining a working distance of the target in the range. The controller is operative, in a far-out reading mode of operation, for setting the output power to a far-out power level when the rangefinder determines that the target is located in a far-out region of the range, and is further operative, in a close-in reading mode of operation, for increasing the output power to an elevated close-in power level that is greater than the far-out power level when the rangefinder determines that the target is located in a close-in region of the range. The above-described operation of the power safety arrangement is particularly beneficial when performed during the close-in reading mode of operation.

A method, in accordance with another aspect of this disclosure, of electro-optically reading a target located in a range of working distances in the presence of ambient interference light to be mitigated, is performed by emitting a laser beam from a laser diode having an adjustable output power, by monitoring the output power of the laser beam with a monitor photodiode having a responsivity characteristic, by scanning the laser beam across the target for reflection and scattering therefrom as return laser light over an adjustable scan angle, by generating an output signal by detecting the return laser light from the target to convert the detected return laser light into an analog electrical information signal bearing information related to the target, and by concomitantly detecting the ambient interference light to convert the detected ambient interference light into an analog electrical ambient interference light signal. The method is further performed by determining a working distance of the target in the range; by setting the output power to a far-out power level in a far-out reading mode of operation when the rangefinder determines that the target is located in a far-out region of the range; by initially adjusting the output power to a test power level when the rangefinder determines that the target is located in a close-in region of the range in a close-in reading mode of operation; by subsequently increasing, in the close-in reading mode, the output power for a predetermined time period from the test power level to an elevated close-in power level at which the information signal of the processed output signal has a greater magnitude than that of the interference light signal to mitigate the presence of the ambient interference light, and by subsequently decreasing, in the close-in reading mode, the output power to the test power level after elapse of the predetermined time period. The method is still further performed by checking the output power of the laser beam in the close-in reading mode, by testing the output power at the test power level with a first power monitor operatively connected to the laser diode, and by testing the output power at the test power level and at the elevated close-in power level with a second power monitor operatively connected to the monitor photodiode.

Turning now to the drawings, FIG. 1 depicts a handheld, moving laser beam reader 10 implemented in a gun-shaped housing 55 having a pistol-grip type of handle 53. The housing 55 contains a laser drive or light source 46, preferably a semiconductor laser diode, for emitting an outgoing laser beam 51 having an adjustable output power to a target, such as a bar code symbol 70, for reflection and scattering therefrom; a photodetector 58, preferably a photodiode, for detecting incoming light 52; a focusing optical assembly 57, preferably one or more focusing lenses, for focusing the outgoing laser beam 51 as a beam spot on the symbol 70; an application specific integrated circuit (ASIC) 20 mounted on a printed circuit board (PCB) 61; a programmed microprocessor or controller 40, also preferably mounted on the PCB 61; and a power source or battery 62, preferably mounted in the handle 53. A light-transmissive window 56 at a front end of the housing 55 allows the outgoing laser light beam 51 to exit the housing 55, and the incoming light 52 to enter the housing 55. A user holds the reader 10 by the handle 53, and aims the reader 10 at the symbol 70, preferably at a distance away from the symbol 70. To initiate reading, the user pulls a trigger 54 on the handle 53. The reader 10 may optionally include a keyboard 48 and a display 49 readily accessible to the user.

As further depicted in FIG. 1, the laser beam 51 emitted by the laser light source 46 passes through a partially-silvered mirror 47 to a scan drive component or oscillating scan mirror 59, which is coupled to a drive motor 60, preferably energized when the trigger 54 is manually pulled. The oscillation of the mirror 59 causes the outgoing laser beam 51 to sweep back and forth over an adjustable scan angle in a desired scan pattern, e.g., a scan line, across the symbol 70. A variety of mirror and motor configurations can be used to move the laser beam in the desired scan pattern. For example, the mirror 59 need not be a concave mirror as illustrated, but could be a planar mirror that is repetitively and reciprocally driven in alternate circumferential directions over a scan angle about a drive shaft on which the planar mirror is mounted.

Figure 4:
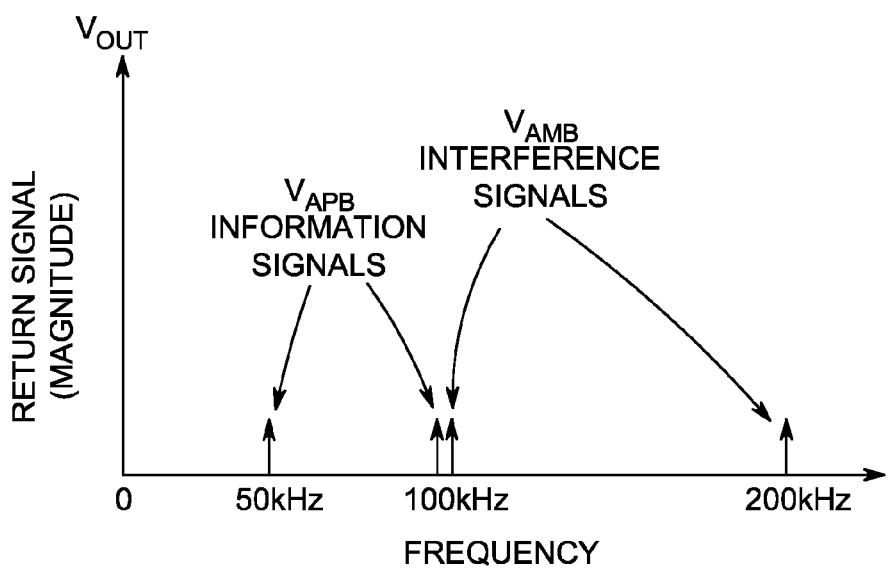
FIG. 4 is a magnitude-versus-frequency graph of a return signal depicting interference between information signals and ambient light signals.
Figure 5:
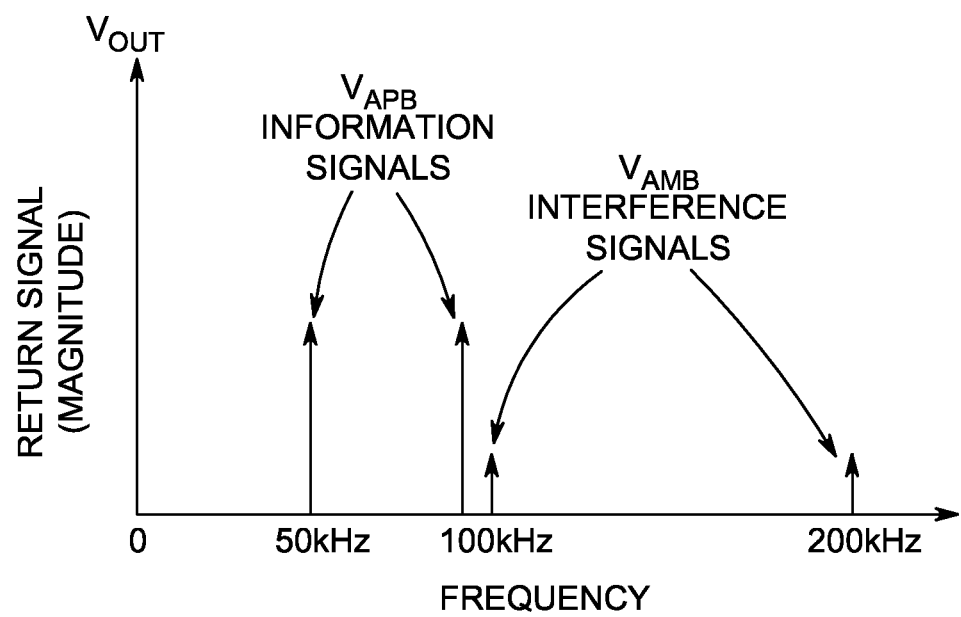
FIG. 5 is a graph analogous to FIG. 4, but diagrammatically showing how the ambient light signals are mitigated.

As further depicted in FIG. 1, the incoming light 52 may have two light components that come from two different sources. The first light component is return laser light derived from the laser light source 46 and is generated by reflection and/or scattering of the laser light beam 51 back by the symbol 70 through the window 56. The second light component is ambient light 82 derived from an external ambient light source 80 operative for emitting the ambient light 82. As described above, the external light source 80 at a venue can be sunlight, one or more incandescent bulbs, one or more fluorescent lamps, one or more light emitting diodes (LEDs), and the like. In the exemplary reader 10 shown in FIG. 1, the incoming light 52 reflects off of the scan mirror 59 and the partially-silvered mirror 47 and impinges on the detector 58. The detector 58 produces an analog electrical output signal ($V_{OUT}$) proportional to the intensity of the return light 52. A first component signal of the output signal $V_{OUT}$ of the return light 52 that is returned from the symbol 70 and that is derived from the laser light from the laser light source 46 is hereinafter described as an "information" signal ($V_{ABP}$) bearing information related to the symbol 70 (see FIGS. 4-5). The subscript ABP is an abbreviation for analog bar pattern. A second component signal of the output signal $V_{OUT}$ of the return light 52 that is derived from the ambient light source 80 is hereinafter described as an "ambient light" or "interfering" signal ($V_{AMB}$), as shown in FIGS. 3-5.

Figure 3:
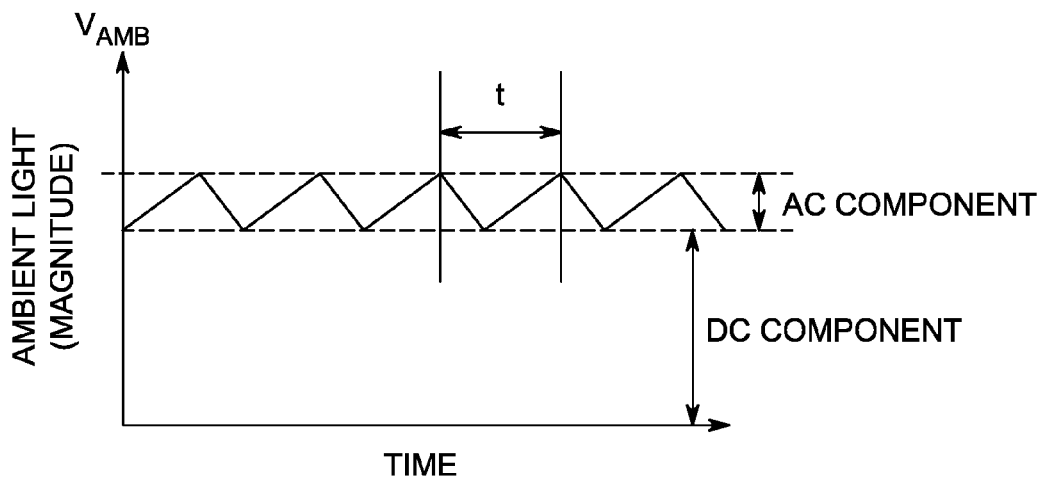
FIG. 3 is a magnitude-versus-time graph depicting characteristics of an ambient light signal to be mitigated.

As also described above, when fluorescent lamps and LEDs are operated at kilohertz frequencies, then, as best shown in FIG. 3, the analog electrical ambient light signal $V_{AMB}$ has a constant illumination DC component and a relatively large time-varying AC frequency component at kilohertz frequencies, typically anywhere from 30 kHz to 300 kHz. There are circumstances where the time-varying frequency component and the magnitude component of the ambient light signal $V_{AMB}$ are too close in frequency and magnitude to the frequency and magnitude of the information signal $V_{ABP}$, in which event the ambient light signal $V_{AMB}$ can interfere and impede the decoding of the information signal $V_{ABP}$, thus degrading the performance of the reader 10. By way of non-limiting example, as illustrated in FIG. 4, an information signal $V_{ABP}$ of about 50 kHz and its harmonic of about 100 kHz can be generated during reading of a low density symbol 70 located relatively close to the reader 10, e.g., about 10 inches or less away. If the LEDs are operated at about 100 kHz, then ambient light signal $V_{AMB}$ will have a frequency of about 100 kHz and its harmonic will have a frequency of about 200 kHz. The 100 kHz frequencies of the ambient light signal $V_{AMB}$ and the information signal $V_{ABP}$ are too close, both in frequency and in magnitude, and will cause an interference, and perhaps cause the symbol 70 not to be successfully read. One aspect of this disclosure is to mitigate such interference.

Figure 2:
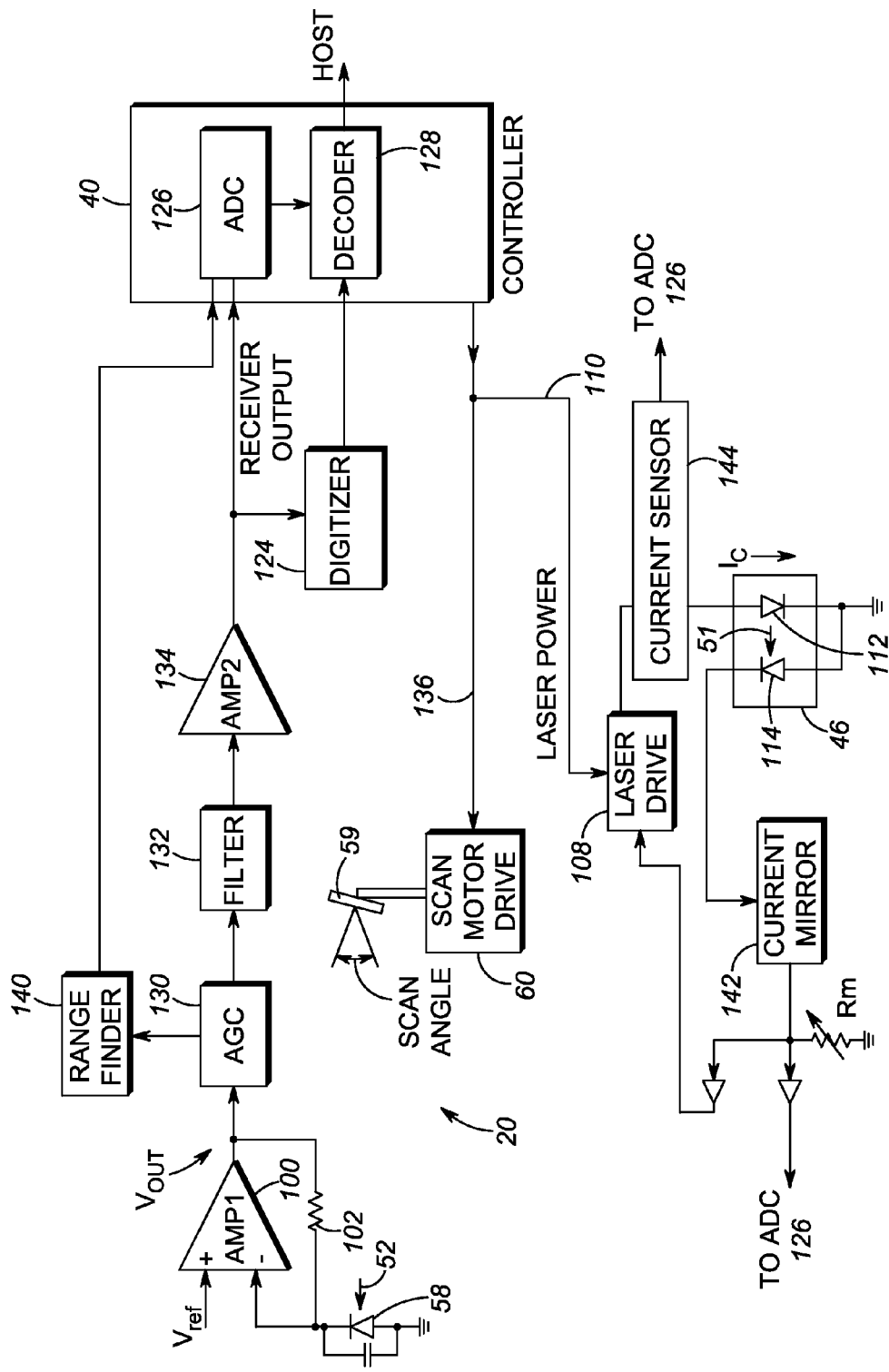
FIG. 2 is an electrical circuit schematic of a signal processing receiver circuit for use in the apparatus of FIG. 1.

The ASIC 20, as shown in the embodiment of FIG. 2, includes a signal processing receiver circuit connected to the photodetector 58, which, as described above, outputs the output signal $V_{OUT}$. The signal processing receiver circuit includes at least one amplifier (AMP1) 100, advantageously configured as a transimpedance amplifier having a resistor 102, to increase the gain of the analog electrical output signal $V_{OUT}$ received from the photodetector 58. The output signal $V_{OUT}$ is serially conducted to an automatic gain controller 130 (AGC), at least one active low-pass filter 132, and at least one amplifier 134 (AMP2).

The signal processing receiver circuit also includes a digitizer 124 which digitizes the output signal from the amplifier 134 by processing the output signal with differentiating circuits, peak detectors, multiplexers, logic elements, and comparators. The digitizer 124 processes the output signal to produce a pulse signal where the widths and spacings between the pulses correspond to the widths of the bars and the spacings between the bars of the symbol 70. The digitizer 124 serves as an edge detector or wave shaper circuit, and threshold points set by the digitizer 124 determines what points of the output signal represent bar edges. The pulse signal from the digitizer 124 is applied to a decoder 128, typically incorporated as software in the programmed controller 40, which will also have associated program memory and random access data memory. The controller 40 also has an analog-to-digital converter (ADC) 126 connected to the decoder 128 and to the output of the amplifier 134. The decoder 128 first determines the pulse widths and spacings of the output signal from the digitizer 124. The decoder 128 then analyzes the widths and spacings to find and decode a legitimate bar code symbol. This includes analysis to recognize legitimate characters and sequences, as defined by the appropriate code standard or symbology. The controller 40 then communicates with an external host over an interface.

A rangefinder 140 is operatively connected between the AGC 130 and the ADC 126. The rangefinder 140 determines the working distance of the symbol 70 by analyzing the gain of the AGC 130. Thus, a high gain would indicate that the symbol 70 is located in a close-in region of the range, while a low gain would indicate that the symbol 70 is located in a far-out region of the range. The rangefinder can also be implemented as hardware in the housing 55. Thus, the rangefinder 140 can be any acoustic- or optical-based distance measuring device that employs, e.g., infrared or ultrasonic techniques to estimate distance. The distance measurement can be a simple "near or far" reading, or can be more accurate by defining a number of zones or regions within the range of working distances.

The controller 40 uses this distance measurement to adjust the output power of the laser beam emitted from the laser light source 46. As shown in FIG. 2, the laser light source 46 includes a laser diode 112 and a monitor photodiode 114 having a responsivity or sensitivity characteristic. The controller 40 controls the laser light source 46 with a laser drive circuit 108 and a primary or first power monitor or current sensor 144 via a control line 110. The output of the primary power monitor 144, whose operation is described below, is operatively connected to the ADC 126. A small fraction of the output laser light is coupled into the monitor photodiode 114 within the enclosed laser light source 46. This induces a photocurrent in the monitor photodiode 114 that is proportional to the laser output power. This photocurrent is a negative feedback signal that is used to regulate the laser's output power via a secondary power monitor or current mirror 142 whose output is also operatively connected to the ADC 126. The controller 40 takes the digital signal from the ADC 126 and uses it to determine if certain safety power limits have been exceeded, as described below.

As also shown in FIG. 2, the controller 40 also uses this distance measurement to control the drive motor 60 over a control line 136. The drive motor 60 sweeps the scan component or oscillating scan mirror 59 over the scan angle between different values, as described below.

Thus, when the rangefinder 140 determines that the symbol 70 is located in a far-out region of the range, the controller 40 is operative, in a far-out reading mode of operation, for setting the output power of the laser beam to a far-out, lower power level, e.g., on the order of 1.7 mW, and for simultaneously setting the scan angle to be narrow, e.g., on the order of 11 degrees. The accessible emission level (AEL) for this sized scan angle is about 2.54 mW, and thus, there is a sufficient output power safety margin. When the rangefinder 140 determines that the symbol 70 is located in a close-in region of the range, the controller 40 is operative, in a close-in reading mode of operation, for setting the scan angle to be wide, e.g., on the order of 52 degrees, and for initially adjusting the output power to a test power level, e.g., on the order of 1.7 mW, and for subsequently increasing the output power for a predetermined time period, e.g., on the order of 20 seconds, from the test power level to an elevated power level, e.g., on the order of 2.4 mW, at which the information signal of the processed output signal has a greater magnitude than that of the interference light signal to mitigate the presence of the ambient interference light, and for subsequently decreasing the output power to the test power level, e.g., on the order of 1.7 mW, after elapse of the predetermined time period. The AEL for this sized scan angle is about 3.7 mW, and thus, there again is a sufficient output power safety margin.

As noted above, the output signal $V_{OUT}$ received from the photodetector 58 has two components: the information signal $V_{ABP}$ and the ambient light signal $V_{AMB}$. In the close-in reading mode, the signal processing circuitry processes the output signal $V_{OUT}$ with the information signal $V_{ABP}$ having a greater magnitude than that of the interference light signal $V_{AMB}$ due to the greater close-in power level to mitigate the presence of the ambient interference light. Thus, as shown in FIG. 5, the magnitude of the 100 kHz information signal $V_{ABP}$ is greater than that of the 100 kHz interference light signal $V_{AMB}$. The signal-to-noise ratio has thus been increased.

As described so far, it is desired to set the laser diode 112 to the greater close-in or elevated power level (e.g., 2.4 mW) in the close-in reading mode to mitigate the presence of the interfering ambient light. However, one aspect of this invention is to determine whether the output power of the laser diode 112 can be so safely increased, especially in the close-in reading mode. Hence, a power safety arrangement is proposed in which the aforementioned dual power monitors 144, 142 are employed.

Prior to reading, the controller 40 and the first power monitor 144 are operated in a calibration mode of operation. The controller 40 sets the laser diode 112 via the laser drive 108 at two different calibration power levels, e.g., a lower calibration level of about 0.5 mW, and a higher calibration level of about 2.0 mW. In response, the first power monitor 144 measures the two corresponding electrical currents ($I_C$) flowing through the laser diode 112. The controller 40 then compares the two currents and stores the difference between these currents as a calibration differential.

Thereupon, during reading in the far-out mode, the controller 40 sets the laser diode 112 via the laser drive 108 at a low test power level (e.g., 0.5 mW) and at the test power level (e.g., 1.7 mW), and the first power monitor 144 measures the two corresponding electrical test currents ($I_C$) flowing through the laser diode 112. The controller 40 then compares the two test currents and stores the difference between these test currents as a test differential. Next, the controller 40, in the far-out reading mode, compares the test and calibration current differentials, and determines that the output power does not exceed a safety limit when the test differential does not exceed the calibration differential.

However, during reading in the close-in mode, where the output power is increased to the elevated close-in power level, the above-described comparison between the test and calibration current differentials cannot be used, because the elevated close-in power level exceeds the higher calibration level. Hence, the controller 40 sequentially adjusts the output power in steps. In an initial step, the controller 40 sets the output power as described above for the far-out mode, and the first power monitor 144 measures the two corresponding electrical test currents ($I_C$) flowing through the laser diode 112. The first power monitor 144 measures the two corresponding electrical test currents ($I_C$) flowing through the laser diode 112, compares the test and calibration current differentials, and determines that the output power does not exceed a safety limit when the test differential does not exceed the calibration differential.

In a subsequent step, the controller 40 increases the output power from the test power level to an elevated power level, e.g., on the order of 2.4 mW, and maintains the output power at the elevated power level only for a limited predetermined time period, e.g., on the order of 20 seconds, after which the controller 40 decreases the output power to the test power level, e.g., on the order of 1.7 mW. The first power monitor 144 performs no checking during this limited time period. Instead, only the second power monitor 142 is operative.

The second power monitor 142 is operative at all times. In a calibration mode of operation, the second power monitor 142 measures calibration voltages corresponding to electrical currents flowing through the monitor photodiode 114 at the test power level and at the elevated power level set by the controller 40, and measures test voltages corresponding to electrical currents flowing through the monitor photodiode 114 at the test power level and at the elevated power level set by the controller in the reading mode of operation. The controller 40 is operative, in the reading mode, for comparing the test and calibration voltages, and for determining that the output power of the laser beam does not exceed a safety level when the test voltages do not exceed the calibration voltages.

Figure 6:
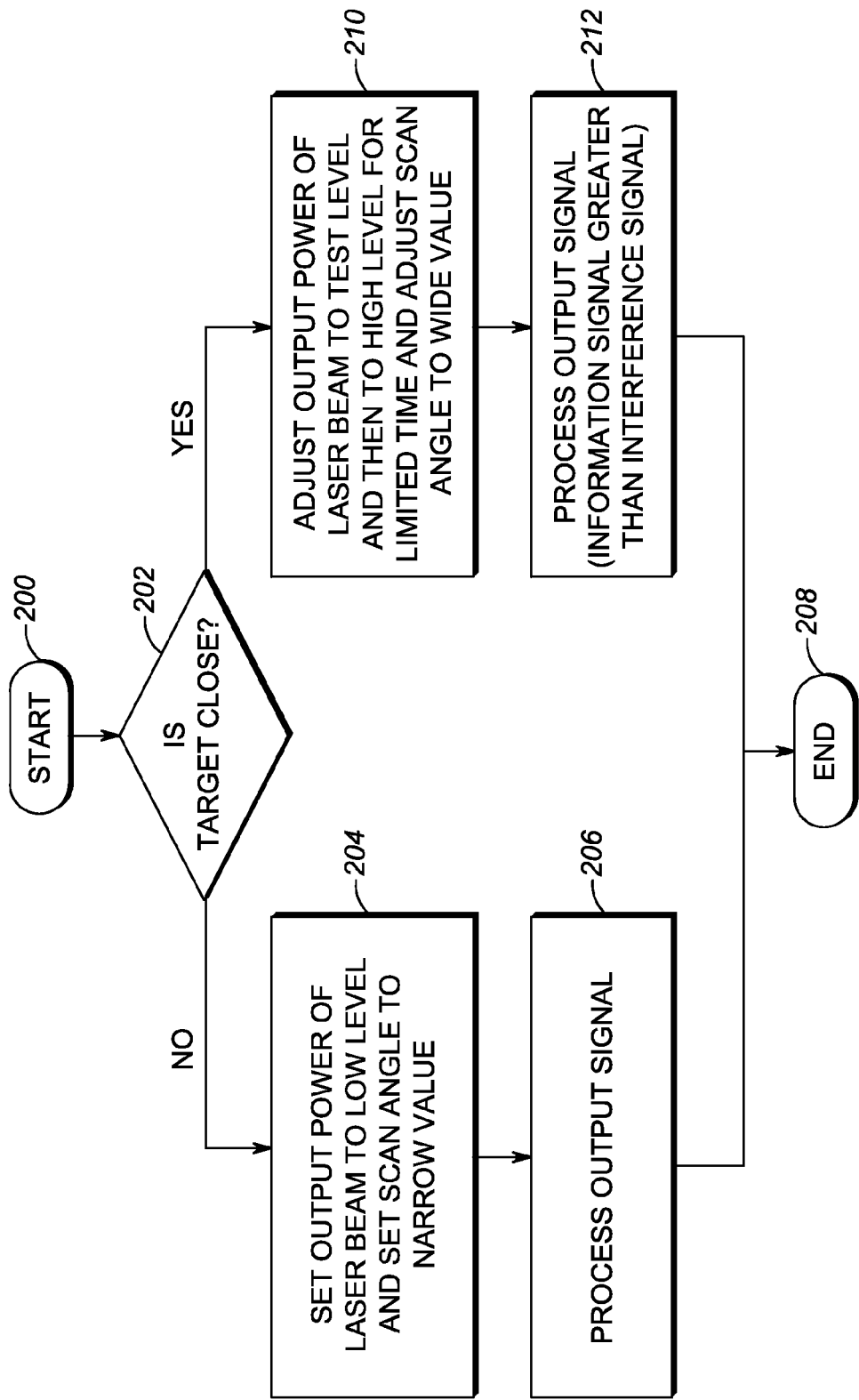
FIG. 6 is a flow chart depicting steps performed in monitoring the elevated output power level of a laser beam when mitigating an ambient light signal in accordance with the method of the present disclosure.

As depicted in the flow chart of FIG. 6, beginning a reading session at start step 200, the rangefinder 140 determines whether the symbol 70 is close or far in step 202. If far, then the controller 40 sets the output power of the laser beam to a low level and simultaneously sets the scan angle to a narrow value in step 204. The output signal is then processed in the far-out reading mode in step 206 before ending the session at step 208. If close, then the controller 40 sets the output power of the laser beam to a test level, and then to a high level for a limited time, and simultaneously sets the scan angle to a wide value in step 210. The output signal is then processed in the close-in reading mode in step 212 before ending the session at step 208.

In certain applications, e.g., in processing items on a conveyor belt, the laser light source 46 is energized all the time, in which event the controller 40 may be programmed to periodically check the output power of the laser beam, and to deenergize the laser light source 46 if a safety power level has been exceeded. The controller 40 can also set an expirable time period for the high output power level to last.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for electro-optically reading a target in the presence of ambient interference light to be mitigated, comprising:
   a laser drive including a laser diode for emitting a laser beam having an adjustable output power, and a monitor photodiode for monitoring the output power of the laser beam with a responsivity characteristic;

a scan drive for scanning the laser beam across the target for reflection and scattering therefrom as return laser light;

a photodetector for generating an output signal by detecting the return laser light from the target to convert the detected return laser light into an analog electrical information signal bearing information related to the target, and by concomitantly detecting the ambient interference light to convert the detected ambient interference light into an analog electrical ambient interference light signal;

signal processing circuitry for processing the output signal, the signal processing circuitry including a controller operatively connected to the laser drive and operative, in a reading mode of operation, for initially adjusting the output power to a test power level, and for subsequently increasing the output power for a predetermined time period from the test power level to an elevated power level at which the information signal of the processed output signal has a greater magnitude than that of the interference light signal to mitigate the presence of the ambient interference light, and for subsequently decreasing the output power to the test power level after elapse of the predetermined time period; and a power safety arrangement for checking the output power of the laser beam in the reading mode, the power safety arrangement including a first power monitor operatively connected to the laser diode for testing the output power at the test power level, and a second power monitor operatively connected to the monitor photodiode for testing the output power at the test power level and at the elevated power level.

2. The apparatus of claim 1, wherein the first power monitor is operative for measuring a calibration differential of electrical current flowing through the laser diode at different calibration power levels set by the controller in a calibration mode of operation, and for measuring a test differential of electrical current flowing through the laser diode at the test power level and at another lower test power level in the reading mode; and wherein the controller is operative, in the reading mode, for comparing the test and calibration differentials, and for determining that the output power of the laser beam does not exceed a safety level when the test differential does not exceed the calibration differential.

3. The apparatus of claim 1, wherein the second power monitor is operative for measuring calibration voltages corresponding to electrical currents flowing through the monitor photodiode at the test power level and at the elevated power level set by the controller in a calibration mode of operation, and for measuring test voltages corresponding to electrical currents flowing through the monitor photodiode at the test power level and at the elevated power level set by the controller in the reading mode of operation and wherein the controller is operative, in the reading mode, for comparing the test and calibration voltages, and for determining that the output power of the laser beam does not exceed a safety level when the test voltages do not exceed the calibration voltages.

4. The apparatus of claim 1, wherein the second power monitor is the only operative monitor during the predetermined time period.

5. The apparatus of claim 1, wherein the test power level is about 1.7 mW, and wherein the elevated power level is about 2.4 mW, and wherein the predetermined time period is on the order of 20 seconds.

6. An apparatus for electro-optically reading a target located in a range of working distances in the presence of ambient interference light to be mitigated, comprising:

a laser drive including a laser diode for emitting a laser beam having an adjustable output power, and a monitor photodiode for monitoring the output power of the laser beam with a responsivity characteristic;

a scan drive for scanning the laser beam across the target for reflection and scattering therefrom as return laser light over an adjustable scan angle;

a photodetector for generating an output signal by detecting the return laser light from the target to convert the detected return laser light into an analog electrical information signal bearing information related to the target, and by concomitantly detecting the ambient interference light to convert the detected ambient interference light into an analog electrical ambient interference light signal;

signal processing circuitry for processing the output signal, the signal processing circuitry including a rangefinder for determining a working distance of the target in the range, and a controller operatively connected to the laser drive, the scan drive, the photodetector and the rangefinder, the controller being operative, when the rangefinder determines that the target is located in a far-out region of the range in a far-out reading mode of operation, for setting the output power to a far-out power level, and the controller being operative, when the rangefinder determines that the target is located in a close-in region of the range in a close-in reading mode of operation, for initially adjusting the output power to a test power level, and for subsequently increasing the output power for a predetermined time period from the test power level to an elevated close-in power level at which the information signal of the processed output signal has a greater magnitude than that of the interference light signal to mitigate the presence of the ambient interference light, and for subsequently decreasing the output power to the test power level after elapse of the predetermined time period; and a power safety arrangement for checking the output power of the laser beam in the close-in reading mode, the power safety arrangement including a first power monitor operatively connected to the laser diode for testing the output power at the test power level, and a second power monitor operatively connected to the monitor photodiode for testing the output power at the test power level and at the elevated close-in power level.

7. The apparatus of claim 6, wherein the controller is operative for adjusting the scan angle between a far-out value in the far-out reading mode and a close-in value greater than the far-out value in the close-in reading mode.

8. The apparatus of claim 7, wherein the controller is operative for adjusting the scan angle to the far-out value and the output power to the far-out power level during the far-out reading mode, and for adjusting the scan angle to the close-in value and the output power to the test and close-in power levels during the close-in reading mode.

9. The apparatus of claim 7, wherein the far-out value is about 11 degrees, and wherein the close-in value is about 52 degrees; and wherein the far-out power level is about 1.7 mW, and wherein the elevated close-in power level is about 2.4 mW.

10. The apparatus of claim 6, wherein the signal processing circuitry includes an automatic gain circuit (AGC) having a gain, and wherein the rangefinder is operatively connected to the AGC for determining the working distance of the target by analyzing the gain.

11. A method of electro-optically reading a target located in a range of working distances in the presence of ambient interference light to be mitigated, comprising:
- emitting a laser beam from a laser diode having an adjustable output power;
- monitoring the output power of the laser beam with a monitor photodiode having a responsivity characteristic;
- scanning the laser beam across the target for reflection and scattering therefrom as return laser light over an adjustable scan angle;
- generating an output signal by detecting the return laser light from the target to convert the detected return laser light into an analog electrical information signal bearing information related to the target, and by concomitantly detecting the ambient interference light to convert the detected ambient interference light into an analog electrical ambient interference light signal;
- determining a working distance of the target in the range;
- setting the output power to a far-out power level in a far-out reading mode of operation when the rangefinder determines that the target is located in a far-out region of the range;
- initially adjusting the output power to a test power level when the rangefinder determines that the target is located in a close-in region of the range in a close-in reading mode of operation;
- subsequently increasing, in the close-in reading mode, the output power for a predetermined time period from the test power level to an elevated close-in power level at which the information signal of the processed output signal has a greater magnitude than that of the interference light signal to mitigate the presence of the ambient interference light;
- subsequently decreasing, in the close-in reading mode, the output power to the test power level after elapse of the predetermined time period; and
- checking the output power of the laser beam in the close-in reading mode, by testing the output power at the test power level with a first power monitor operatively connected to the laser diode, and by testing the output power at the test power level and at the elevated close-in power level with a second power monitor operatively connected to the monitor photodiode.

12. The method of claim 11, and measuring a calibration differential of electrical current flowing through the laser diode at different calibration power levels in a calibration mode of operation, measuring a test differential of electrical current flowing through the laser diode at the test power level and at another lower test power level in the close-in reading mode, comparing the test and calibration differentials, and determining that the output power of the laser beam does not exceed a safety level when the test differential does not exceed the calibration differential.

13. The method of claim 11, and measuring calibration voltages corresponding to electrical currents flowing through the monitor photodiode at the test power level and at the elevated power level in a calibration mode of operation, measuring test voltages corresponding to electrical currents flowing through the monitor photodiode at the test power level and at the elevated power level in the close-in reading mode, comparing the test and calibration voltages, and determining that the output power of the laser beam does not exceed a safety level when the test voltages do not exceed the calibration voltages.

14. The method of claim 11, wherein the second power monitor is the only operative monitor during the predetermined time period.

15. The method of claim 11, and configuring the test power level to be about 1.7 mW, and configuring the elevated close-in power level to be about 2.4 mW, and configuring the predetermined time period to be on the order of 20 seconds.

16. The method of claim 11, and adjusting the scan angle between a far-out value in the far-out reading mode and a close-in value greater than the far-out value in the close-in reading mode.

17. The method of claim 16, and adjusting the scan angle to the far-out value and the output power to the far-out power level during the far-out reading mode, and adjusting the scan angle to the close-in value and the output power to the test and elevated close-in power levels during the close-in reading mode.

18. The method of claim 17, and dynamically adjusting the scan angle and the output power during reading.

19. The method of claim 11, wherein the determining of the working distance of the target is performed by analyzing a gain of an automatic gain circuit (AGC).

20. The method of claim 11, and configuring the far-out value to be about 11 degrees, and configuring the close-in value to be about 52 degrees; and configuring the far-out power level to be about 1.7 mW, and configuring the elevated close-in power level to be about 2.4 mW.

* * * * *